Patented Feb. 16, 1954

2,669,557

UNITED STATES PATENT OFFICE 2,669,557

PROCESS FOR MAKING WATER-SOLUBLE SULFONATED VINYL AROMATIC RESINS

Robert M. Wheaton, Midland, Mich., assignor to The Dow Chemical Company, Midland, Mich., a corporation of Delaware No Drawing. Application January 21, 1953, Serial No. 332,550

6 Claims. (Cl. 260—79.3)

This invention concerns a process for making water-soluble sulfonated vinyl aromatic resins. It relates more particularly to a method of treating an insoluble sulfonated copolymer of a monovinyl aromatic hydrocarbon and a minor amount of a divinyl aromatic hydrocarbon to produce a resinous water-soluble sulfonated product.

Sulfonated vinyl aromatic resins and methods of making the same are well known. D'Alelio in U. S. Patent No. 2,366,007 describes the preparation of sulfonated polymers and copolymers of polyvinyl aromatic compounds, e. g. sulfonated copolymers of styrene and divinylbenzene. The products are insoluble cross-linked resins suitable for use in the removal of cations from fluids.

It has now been found that an insoluble sulfonated cross-linked copolymer of a predominant amount of a monovinyl aromatic hydrocarbon and a minor proportion, e. g. 20 per cent by weight or less, of a divinyl aromatic hydrocarbon can readily be converted to a resinous water-soluble sulfonated product by treating the insoluble sulfonated copolymer with an aqueous solution of nitric acid at elevated temperatures. This treatment apparently involves a partial oxidation of the insoluble sulfonated copolymer with resultant cleavage of at least a portion of the polymer chains, or cross-linkages between polymer molecules, or both, and formation of a water-soluble sulfonated product.

Surprisingly, it has been found that an insoluble cation exchange resin such as the sulfonated cross-linked copolymers of a major proportion of one or more monovinyl aromatic hydrocarbons and a minor amount of a divinyl aromatic hydrocarbon can be treated with an aqueous solution of nitric acid in concentration of at least 30 per cent by weight at elevated temperatures and converted into a resinous water-soluble product containing sulfonic acid groups. Usually little, if any, change in the proportion of the sulfonic acid groups per aromatic nucleus in the copolymer occurs, although the oxidation reaction appears to involve the introduction of nitro groups, together with formation of carboxylic acid groups in the resinous water-soluble product. The yield of said product is substantially quantitative.

Sulfonated cross-linked copolymers which can readily be converted into water-soluble products containing sulfonic acid radicals attached to the aromatic nuclei by the method herein described are the sulfonated copolymers of one or more monovinyl aromatic hydrocarbons of the benzene series such as styrene, vinyltoluene, vinylxylene, ethylvinylbenzene, diethylvinylbenzene, ethylvinyltoluene, ethylvinylxylene, or isopropylstyrene, with one or more divinyl aromatic hydrocarbons, e. g. divinylbenzene, divinyltoluene, divinylxylene, or divinylethylbenzene, which copolymers contain from 0.25 to 20 per cent by weight, usually from 1 to 12 per cent, of the divinyl aromatic hydrocarbon chemically combined, or interpolymerized, with the monovinyl aromatic hydrocarbon.

The cross-linked insoluble sulfonated copolymers should contain an average of at least 0.3, preferably from 0.3 to 1, sulfonic acid radical per aromatic nucleus in the copolymer. Such sulfonated insoluble copolymers or cation exchange resins may conveniently be prepared by procedure described in U. S. Patent No. 2,500,149.

The nitric acid is usually employed as an aqueous solution, suitably in concentration of from 30 to 90, preferably from 35 to 70, per cent by weight of the solution. In most instances, from one to ten parts by weight of the aqueous nitric acid solution is used per part of the insoluble sulfonated copolymer starting material, but the acid solution can be used in smaller or larger proportions.

The reaction is usually carried out at a temperature of from 90° to 120° C. and at atmospheric pressure or thereabout. The reaction is preferably carried out with agitation and at the reflux temperature of the mixture. Gaseous by-products, e. g. oxides of nitrogen, formed in the reaction are vented from the reaction zone.

In practice, an insoluble sulfonated copolymer of a monovinyl aromatic hydrocarbon and a divinyl aromatic hydrocarbon such as a sulfonated copolymer of styrene and divinylbenzene, or a sulfonated copolymer of styrene, ethylvinylbenzene and divinylbenzene, in granular form, is suspended in an aqueous solution of nitric acid, e. g. an equal volume or more of an aqueous solution of from 30 to 70 per cent by weight of nitric acid. The mixture is stirred and heated to a reaction temperature between 90° and 120° C., suitably under reflux at atmospheric pressure or thereabout, until the sulfonated copolymer is completely dissolved with formation of a clear or nearly clear solution. Thereafter, the solution is evaporated, preferably in vacuum, to distill off and separate water and nitric acid, together with other volatile components from the resinous water-soluble product. The product may be further purified by dissolving the same in water and evaporating the solution, preferably in vacuum, one or more times to remove residual traces of nitric acid. The product is cooled and is crushed or broken to a granular form for convenience in handling.

The water-soluble resinous products are useful as thickening agents for synthetic latices or as dispersing agents for suspending finely divided inert materials in aqueous solutions, e. g. for the suspension of clay in water in the preparation of well-drilling muds.

The following examples illustrate ways in which the principle of the invention has been applied, but are not to be construed as limiting the scope of the invention.

*Example 1*

A charge of 10 grams of a batch of an insoluble granular sulfonated copolymer of approximately 87 per cent styrene, 5 per cent ethylvinylbenzene and 8 per cent divinylbenzene, together with 100 grams of an aqueous solution of nitric acid in concentration of 50 per cent by weight, was placed in a glass reaction vessel equipped with a reflux condenser and stirrer. The insoluble sulfonated copolymer employed in this and the subsequent examples was a cation exchange resin. The resin was in its hydrogen, i. e. its acidic, form and had an ion exchange capacity of 5.12 milliequivalents per gram of the dry resin, corresponding to an average of approximately one sulfonic acid group ($-SO_3H$) per aromatic nucleus in the copolymer. The mixture of the insoluble sulfonated copolymer and the aqueous solution of the nitric acid was stirred and heated under reflux at temperatures of from 102° to 107° C. for 21 hours. A clear yellow solution was obtained. The solution was concentrated by heating the same on a steam bath. It was then heated in vacuum to distill off and separate water, nitric acid and other volatile components from the residue, or product. The residue was dissolved in 100 cc. of water and the solution evaporated by heating in vacuum at a temperature of 80° C. and 10 millimeters absolute pressure. There was obtained a brittle yellow colored residue as product. It was soluble in water and had an acid value corresponding to an ion exchange capacity of 6.32 milliequivalents per gram of the product.

*Example 2*

A charge of 10 grams of the batch of the insoluble sulfonated copolymer described in Example 1, together with 100 grams of an aqueous solution containing 70 per cent by weight of nitric acid was heated under reflux at a temperature of 103° C. over a period of 72 hours. A clear yellow solution was obtained. The solution was heated in vacuum at a temperature of 80° C. at 10 millimeters absolute pressure to distill off and separate volatile components from the residue, or product. The product was a brittle brown solid. It was soluble in water and had an acid value corresponding to an anion exchange capacity of 7.22 milliequivalents per gram.

*Example 3*

A charge of 10 grams of the batch of the insoluble sulfonated copolymer described in Example 1, together with 100 grams of an aqueous solution containing approximately 90 per cent by weight of nitric acid was placed in a glass reaction vessel equipped with a reflux condenser and stirrer. The mixture was stirred and heated under reflux at temperatures of from 97° and 103° C. over a period of 48 hours. Oxides of nitrogen formed in the reaction were vented through the reflux condenser. A clear brown solution was obtained. The solution was evaporated by heating the same in vacuum at a temperature of 80° C. and 10 millimeters absolute pressure. A dark-brown resinous product was obtained. The product was soluble in water and had an acid value corresponding to an ion exchange capacity of 6.62 milliequivalents per gram.

*Example 4*

A charge of 10 grams of the batch of the insoluble sulfonated copolymer described in Example 1, together with 100 grams of an aqueous solution of nitric acid in concentration of 30 per cent by weight, was heated in a glass reaction vessel under reflux at temperatures of from 102° to 110° C. over a period of 13 days. A clear yellow solution was obtained. The solution was evaporated in vacuum at a temperature of 80° C. and 10 millimeters absolute pressure to distill off and separate water, together with other volatile components from the product. The residue, or product, is a yellow, brittle solid which is soluble in water. It had an acid value corresponding to an ion exchange capacity of 8.35 milliequivalents per gram.

*Example 5*

A charge of 50 grams of the batch of the insoluble sulfonated copolymer described in Example 1, together with 50 cc. of an aqueous solution containing 40 per cent by weight of nitric acid, was heated in a glass reaction vessel under reflux temperatures over a period of 24 hours. A clear yellow solution was obtained.

I claim:

1. A process for making a water-soluble resinous product containing sulfonic acid radicals, which comprises heating an insoluble sulfonated cross-linked copolymer of a predominant proportion of at least one monovinyl aromatic hydrocarbon and from 0.25 to 20 per cent by weight of at least one divinyl aromatic hydrocarbon, in admixture with an aqueous solution of nitric acid in concentration of at least 30 per cent by weight at a reaction temperature of from 90° to 120° C., whereby the insoluble sulfonated copolymer is dissolved and converted into a water-soluble sulfonated copolymer.

2. A process as claimed in claim 1, wherein the aqueous starting solution contains nitric acid in concentration of from 30 to 90 per cent by weight.

3. A process as claimed in claim 1, wherein the insoluble sulfonated copolymer contains an average of from 0.3 to 1 sulfonic acid radical per aromatic nucleus in the copolymer.

4. A process as claimed in claim 1, wherein the insoluble sulfonated copolymer contains in chemically combined form at least 80 per cent by weight of styrene, together with lesser amounts of ethylvinylbenzene and divinylbenzene.

5. A process for making a water-soluble resinous product containing sulfonic acid radicals, which comprises heating an insoluble sulfonated cross-linked copolymer of vinyl aromatic hydrocarbons, including styrene and from 0.25 to 20 per cent of divinylbenzene, in admixture with an aqueous solution of nitric acid in concentration of from 30 to 90 per cent by weight and at a reaction temperature of from 90° to 120° C., whereby the insoluble sulfonated copolymer is dissolved and converted into a water-soluble sulfonated copolymer.

6. A process for making a water-soluble resinous product containing sulfonic acid radicals, which comprises heating an insoluble sulfonated cross-linked copolymer of at least 80 per cent by weight of styrene, together with a lesser amount of ethylvinylbenzene and at least 0.25 per cent of divinylbenzene, based on the weight of the copolymer, the said copolymer containing an average of from 0.3 to 1 sulfonic acid radical per aromatic nucleus thereof, in admixture with an aqueous solution containing from 30 to 90 per cent by weight of nitric acid at a reaction temperature of from 90° to 120° C., whereby the insoluble sulfonated copolymer is dissolved and converted into a water-soluble sulfonated copolymer, heating the aqueous solution to distill off water and nitric acid, together with volatile components and leave a normally solid water-soluble resinous product containing sulfonic acid radicals.

ROBERT M. WHEATON.

No references cited.